March 25, 1941.　　　R. T. CORNELIUS　　　2,236,244
MOTOR PUMP UNIT
Filed April 17, 1939　　　3 Sheets-Sheet 1
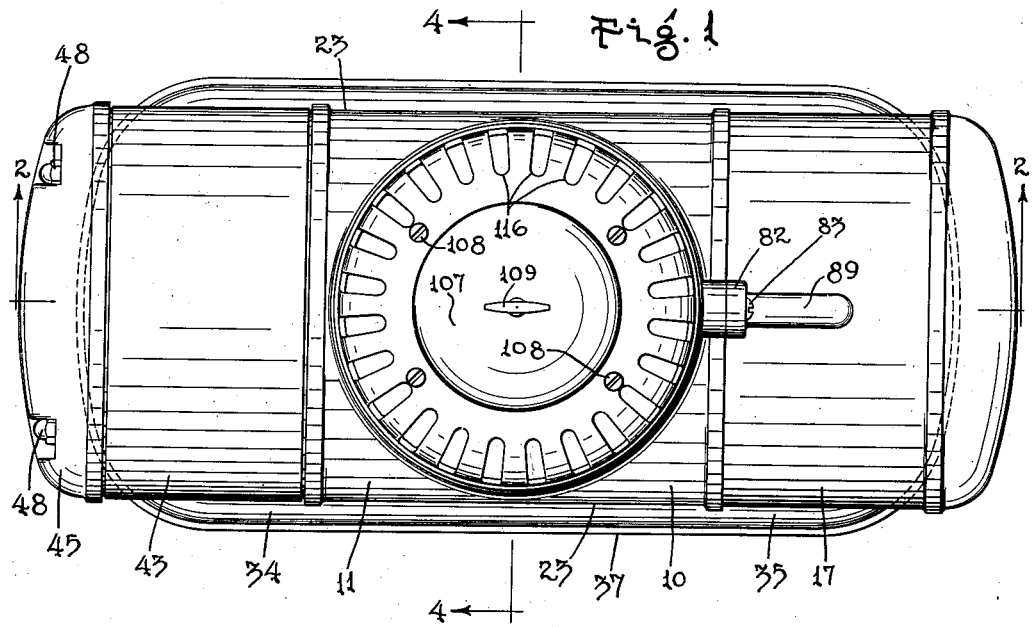
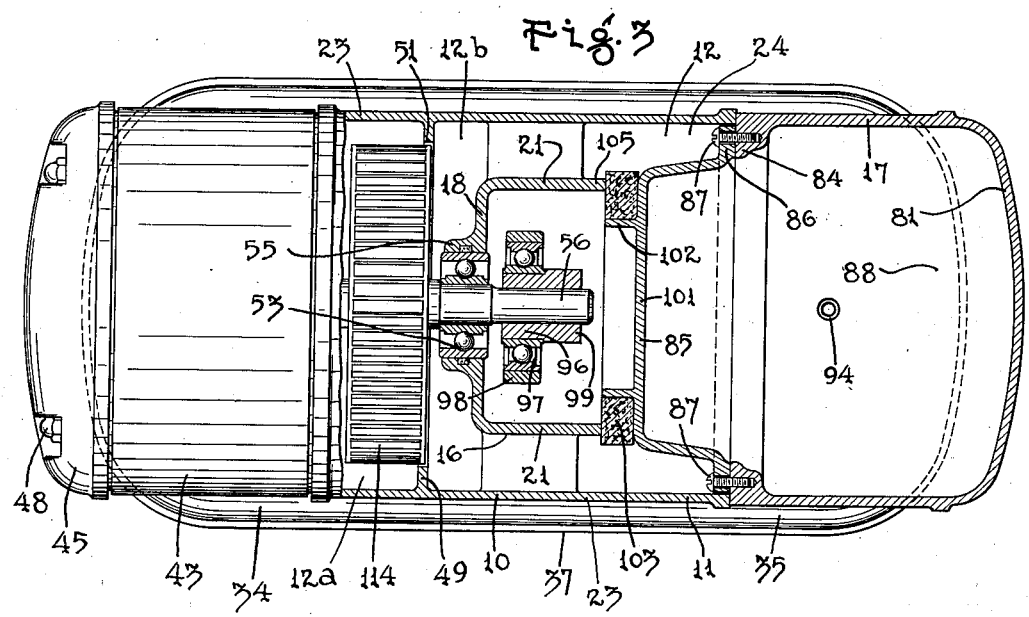
Inventor
Richard T. Cornelius
By Caswell & Lagaard
Attorneys March 25, 1941.  R. T. CORNELIUS  2,236,244
MOTOR PUMP UNIT
Filed April 17, 1939   3 Sheets-Sheet 2
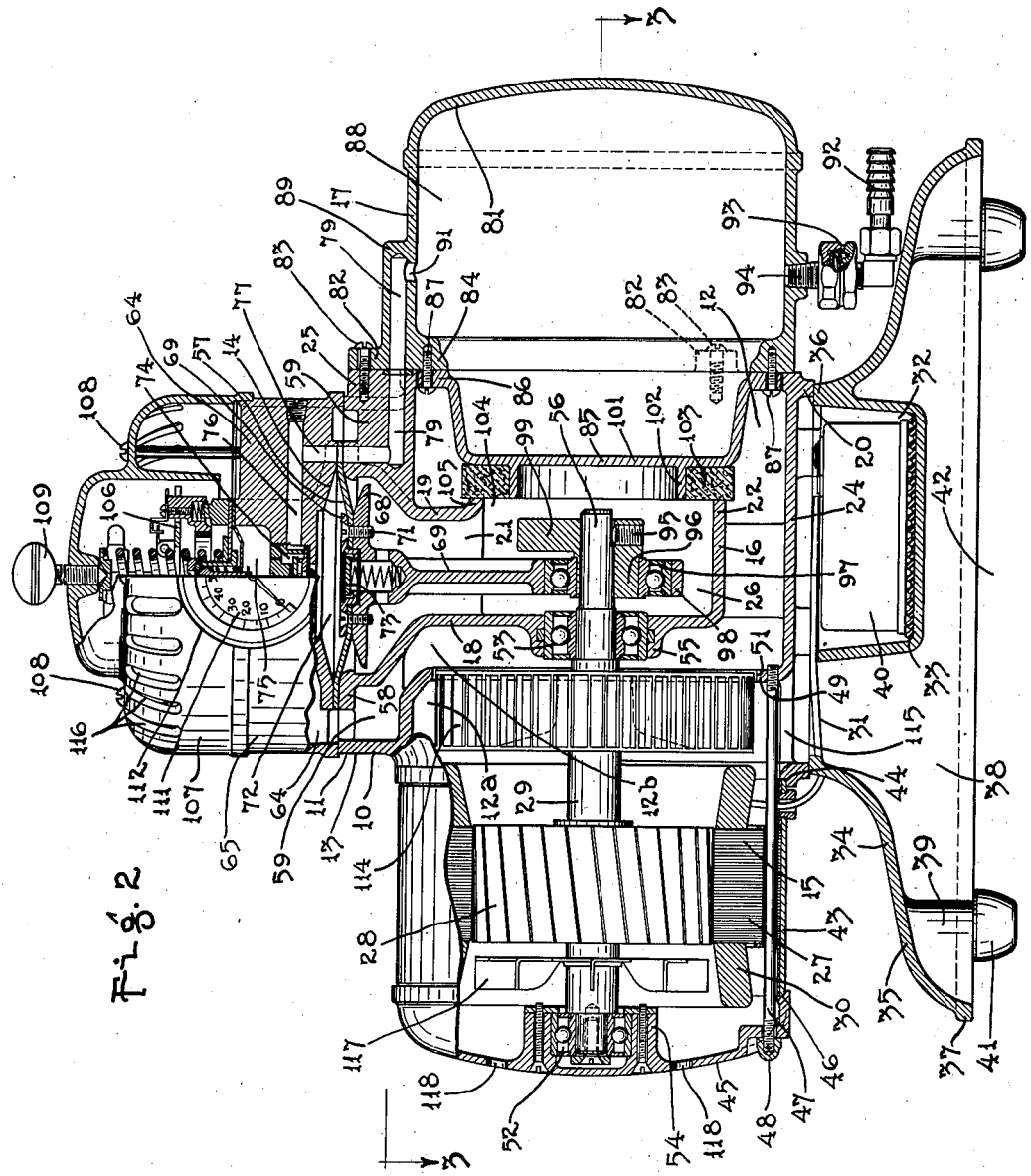
Inventor
Richard T. Cornelius
By Caswell & Lagaard
Attorneys March 25, 1941.  R. T. CORNELIUS  2,236,244
MOTOR PUMP UNIT
Filed April 17, 1939  3 Sheets-Sheet 3
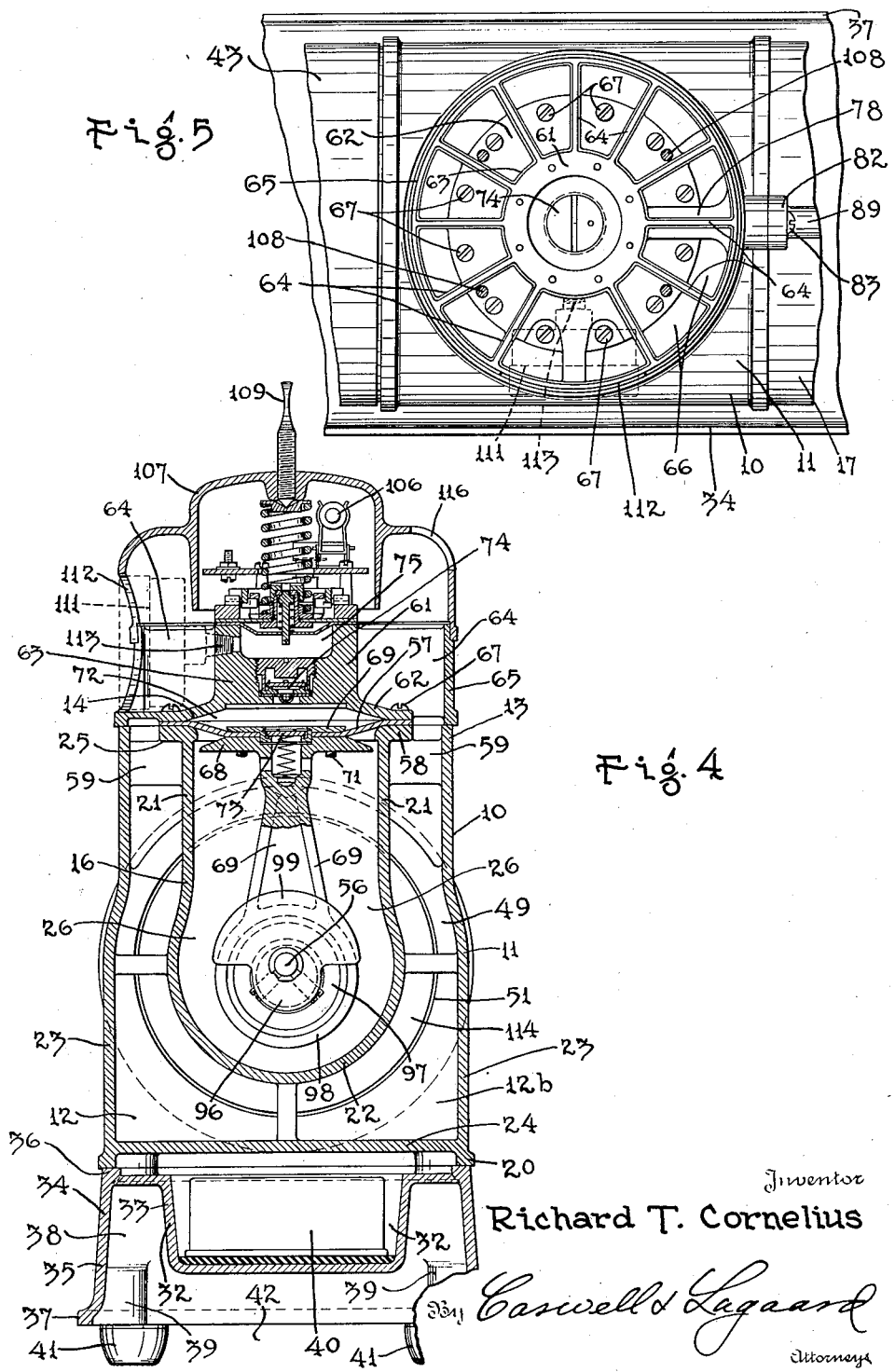
Inventor
Richard T. Cornelius Patented Mar. 25, 1941

2,236,244

UNITED STATES PATENT OFFICE 2,236,244

MOTOR PUMP UNIT

Richard T. Cornelius, Minneapolis, Minn.

Application April 17, 1939, Serial No. 268,279

7 Claims. (Cl. 230—58)

My invention relates to motor pump units and has for an object to provide an extremely compact and efficient motor pump unit.

An object of the invention resides in providing a motor pump unit by means of which filtered air may be delivered to the pump.

Another object of the invention resides in providing a motor pump unit having a receptacle for storing compressed air.

A feature of the invention resides in constructing a motor pump unit so as to avoid the use of tubes or externally applied means for conducting the air from the pump to the receptacle.

Another object of the invention resides in constructing the motor pump unit with means for cooling the pump and associated parts.

An object of the invention resides in utilizing a housing and in placing within the housing a case spaced from the walls thereof and forming a passageway between said case and housing.

Another object of the invention resides in attaching the pump to said case and in leading air from said case and to said pump.

Another object of the invention resides in providing a motor having a rotor shaft extending into said case and driving the pump.

A still further object of the invention resides in providing within the housing a partition dividing the housing in two compartments, one of said compartments containing the case and in disposing in the other compartment a blower for drawing air through the passageway and discharging the same from said other compartment and to the atmosphere.

Another object of the invention resides in spacing the pump and case from the walls of the housing and in providing cooling fins extending between the pump and housing and communicating with the passageway within the first named compartment and leading the air past the pump.

Other objects of the invention reside in the novel combination and arrangement of parts and in the details of construction hereinafter illustrated and described.

In the drawings:

Fig. 1 is a plan view of a motor pump unit illustrating an embodiment of my invention.

Fig. 2 is an elevational sectional view taken substantially on line 2—2 of Fig. 1.

Fig. 3 is a plan sectional view taken on line 3—3 of Fig. 2.

Fig. 4 is an elevational sectional view taken on line 4—4 of Fig. 1.

Fig. 5 is a fragmentary plan view of the motor pump unit with the cover and pressure regulating device removed.

My invention comprises a housing which I have indicated in its entirety by the reference numeral 10. This housing includes a body portion 11 open on two opposite sides and constructed with a chamber 12 within the same. The upper portion of the body 10 is provided with a neck 13 to which is attached a pump indicated in its entirety by the reference numeral 14. On one side of the body portion 11 is mounted a motor 15 which operates the pump 14. A case 16, within the body portion 11, communicates with the pump 14 and serves to direct air to the pump. The air discharged from the pump is led into a receptacle 17 mounted on the body portion 11 on the side thereof opposite the motor 15. These various parts will now be described in detail.

The body portion 11 of housing 10 is preferably cylindrical in form at its ends with the axis thereof running horizontally. The two ends of this body portion are open as previously described. Issuing upwardly from the horizontal cylindrical part of the body portion 11 is the neck 13 which is also cylindrical and arranged with its axis extending in a vertical direction. The lateral walls of the body portion 11 are indicated by the reference numeral 23 and extend vertically below the center of the axis of said body portion and are connected to a horizontal bottom 24. A lip 20 extends about the lowermost edge of the body portion 11 and serves as a support for the housing 10. A vertical partition 49 in the body portion 11 divides the chamber 12 into two compartments, 12a and 12b.

Within the compartment 12a of body portion 11 is disposed the case 16 which consists of two parallel end walls 18 and 19, side walls 21 and a bottom 22. The side walls 21 extend vertically while the bottom 22 is semi-circular in form, as best shown in Fig. 4. All of the walls of the case 16 are spaced from the walls of the housing 10 so that a passageway is formed in compartment 12b which surrounds the case substantially on all sides thereof. The neck 13 is constructed with a cross head 25 which extends across the same and is integral therewith. The walls 18, 19 and 21 of case 16 issue from this cross head and depend therefrom. Within the case 16 is formed a chamber 26.

The housing 10 is supported on a base 34. This base is formed with a flaring wall 35 which terminates at its upper portion in a seat 36 and at its lower portion in a bead 37 extending perimetrically about the same. The base 34 is hollowed to provide a space 38 within it. In the wall 35 is cast a number of bosses 39 to which are attached rubber feet 41. These feet support the base in a raised position above the surface on which the base rests so that the bead 37 is disposed above such surface to provide a passageway 42 therebetween for a purpose to be presently described.

The motor 15 consists of a stator core 27 which is provided with windings 30 of conventional form. Rotatable within the stator 27 is a rotor 28 which is mounted on a motor shaft 29. The motor 15 is of the condenser type and for the purpose a condenser 40 is employed which is connected to the proper windings of the stator of the motor through conductors 31. Condenser 40 is mounted in a pocket 32 formed by a wall structure 33, cast in the base 34 of the device. The core 27 fits snugly within a tubular member 43 which is seated in a seat 44 formed in the body portion 11 at one of the open ends thereof. The tubular member 43 is closed at its other end by means of an end bell 45 which is formed with a recess 46 in which said tubular member is seated. The various parts of the motor are clamped together by means of bolts 47 which are screwed into the partition 49. These bolts have nuts 48 screwed upon the ends thereof which engage the end bell 45 and clamp the parts in position. The partition 49 has an opening 51 in it through which the motor shaft 29 extends. This shaft is journalled in two ball bearings 52 and 53. The ball bearing 52 is mounted in a boss 54 cast in the end ball 45, while the ball bearing 53 is mounted in a boss 55 cast in the wall 18 of case 16. The shaft 29 is of such dimensions that the extreme end 56 thereof projects through the wall 18 and inwardly into the chamber 26 within the case 16.

The pump 14 is of the diaphragm type and includes a diaphragm 57. This diaphragm is supported in the following manner. Formed in the cross head 25 of housing 10 is a ring 58. This ring is connected by means of fins 59 with the neck 13. Ring 58 is directly connected to the walls 18, 19 and 21 of the case 16. The diaphragm 57 rests directly upon the upper surface of the ring 58 and is secured thereto by means of a head or pump body 61. Head 61 is constructed with a flange 62 which overlies the ring 58. The head 61 includes a central portion 63 connected by means of fins 64 with an annular rim 65. By means of the said fins and the fins 59, of body portion 11, passageways are provided which are indicated at 66 in Fig. 5, which passageways communicate with the chamber 12, within the housing 10. The rim 65 is of such dimensions that it fits upon the neck 13 and forms a continuation thereof. The head 61 is secured to the neck 13 by means of screws 67 which pass through the flange 62 and are threaded into the ring 58.

The pump 14 further includes a piston 68 which is cast integral with a connecting rod 69. Piston 68 is disposed upon one side of the diaphragm 57. Upon the other side of the diaphragm 57 is disposed a plate 69 which is attached to the piston 68 by means of screws 71. Within the head 61 is formed a cavity 72 which serves as the expansible chamber of the pump. A valve 73, in the piston 68, conducts air from the chamber 26 in case 16 to the cavity 72. Another valve 74 leads the air compressed in the cavity 72 into a chamber 75 in the upper portion of the head 61.

The connecting rod 69 is operated in the following manner: Attached to the end 56 of shaft 29, by means of a set screw 95, is an eccentric 96. This eccentric has secured to it a ball bearing 97 which is mounted in a boss 98 formed on the end of the connecting rod 69. As the shaft 56 rotates connecting rod 69 is reciprocated and the diaphragm 57 caused to oscillate to pump air. The eccentric 96 has cast integral with it a counter-weight 99, which counter balances the effect of the piston 68 and the connecting rod 69 and causes the pump to run smoothly.

The receptacle 17 consists of a dome-shaped wall structure 81 which is formed with lugs 82 projecting outwardly therefrom at the open end thereof. The receptacle 17 is secured to the body portion 11 of housing 10 by means of screws 83 which are threaded into said housing and which extend through the lugs 82. The wall structure 81, at the open end thereof, is formed with an inwardly turned flange 84. Overlying this flange is a closure 85 which is itself formed with a flange 86 seated upon the flange 84. Screws 87 secure the two flanges together and form a complete fluid tight chamber 88 within the receptacle 17.

Communicating with the valve 74, as best shown in Fig. 2, is a passageway 76 which is formed in an enlargement 78 of one of the fins 64. This passageway communicates with another passageway 77 which extends through the said enlargement 78, the diaphragm 57 and through the cross head 25. This passageway communicates with still another passageway 79 formed in the said cross head which extends through a boss 89 formed on the wall structure 81 of receptacle 17. A port 91 in said wall structure brings the passageway 79 into communication with the chamber 88 of said receptacle. It will thus be noted that air pumped by the diaphragm 57 is forced through the valve 74 and passes along the passageway 76, 77, 79 and the port 91 into the chamber 88 where the same is stored.

For conducting the air from the chamber 88, a nipple 92 is employed which is connected through a coupling 93 with a fitting 94 screwed into the wall structure 81 of receptacle 17.

The closure 85 of receptacle 17 is constructed with an end wall 101. This end wall has a tubular lip 102 extending outwardly therefrom. Encircling this lip is an annular filter 103. In the wall 19 of case 16 is formed an opening 104 which is surrounded by a lip 105. The filter 103 is of such dimensions that the same engages said lip and closes the opening between the end wall 101 of closure 85 and the lip 105. It will thus be seen that air entering the chamber 26 passes through the filter 103.

The pressure within the chamber 75 is controlled by a pressure regulated switch 106 which is connected to the motor 15. This switch forming no particular feature of the instant invention will not be described in detail. The switch 106 is enclosed by means of a cover 107 which overlies the skirt 65 of head 61 and is attached thereto by means of screws 108 which are threaded into the flange 62 of head 61. The switch 106 includes an adjusting screw 109 which is screwed into the cover 107 and by means of which the pressure in the chamber 88 may be regulated.

The pressure within the chamber 75 is indicated by a pressure gauge 111. This pressure gauge is disposed within a recess 112 formed in the skirt 65 and the cover 107. The said gauge is provided with a nipple screwed into a threaded opening 113 in the head 61 which communicates with chamber 75.

For the purpose of cooling the pump 14 and associated structures the shaft 29 has attached to it a blower rotor 114. This rotor is disposed in compartment 12a and fits in the opening 51 in partition 49. Air entering the compartment 12b of chamber 12 is drawn through the opening 51 and discharged by the rotor at the periphery thereof and into compartment 12a on the opposite side of the partition 49. For leading the air from the blower rotor 114 an opening 115 is formed in the bottom 24 of the housing 10. This opening communicates with compartment 12a and the space 38 within the base 34. The cover 107 is constructed with a plurality of air inlets 116 in the upper portion of the same which lead air into the interior of the said cover.

In addition to the blower rotor 114 the usual air circulating fan, such as indicated at 117 in Fig. 2, is provided on the motor shaft 29. This fan causes circulation of air through openings 118 in the end bell 45.

The operation of the invention is as follows: When the switch 106 operates, the motor 15 is energized and shaft 29 rotated. The eccentric 96 thereon causes the connecting rod 69 and piston 68 to reciprocate and operates pump 14 which pumps air. The air enters through the openings 116 in cover 107, and passes through the passageways 66 and into compartment 12b of chamber 12. From compartment 12b the air passes through the filter 103 and into chamber 26. From chamber 26 air passes through the intake valve 73 and into the compression chamber 72. From here the air passes through the exhaust valve 74 and into the chamber 75 and the passageway 76. The air in chamber 75 operates the gauge 111 and also the switch 106 to cut off energization of the motor when the pressure within the chamber 75 reaches a predetermined amount determined by the adjusting screw 109. The air entering passageway 76 passes successively through the passageways 77, 79 and the port 91 and into the chamber 88 of receptacle 17. From here the air is drawn as desired from the nipple 92. Operation of the motor 15 causes rotation of the blower 14 which also draws air through the passageways 116 and 66 into the compartment 12b of chamber 12. The air passes through the opening 51 in the partition 49 and into compartment 12a and is discharged from the blower rotor 114 leaving housing 10 through the opening 115 in the bottom 24 thereof. The air upon leaving housing 10 finally passes into the space 38 and out of the device through the passageway 42.

The advantages of my invention are manifest. An extremely neat and compact construction results which occupies a minimum amount of space. The device is symmetrical in appearance. By the arrangement of air circulating ducts the pump is maintained cool and will therefore operate for an exceedingly long period of time without attention. Since all of the ball bearings are packed with lubricant the motor needs no lubricating. The air entering the pump is filtered so that clogging of the valves of the pump through the accumulation of dirt is prevented. By removal of the air receptacle access to the filter may be had. No pipes, tubes or external connections for leading the air from the pump to the receptacle are required. The device utilizes a minimum number of moving parts.

Changes in the specific form of my invention, as herein disclosed, may be made within the scope of what is claimed without departing from the spirit of my invention.

Having described my invention, what I claim as new and desire to protect by Letters Patent is:

1. In a motor pump unit, a housing, a case within said housing spaced from the walls of said housing and providing a passageway therebetween, said case having a chamber therein, a pump disposed adjacent said case and causing flow of air through said chamber, a receptacle disposed adjacent said case and carried by said housing, said receptacle having a wall spaced from one of the walls of the case, an opening in the wall of the case opposite said receptacle, a lip on said receptacle disposed opposite the opening in said case and an annular filter encircling said lip and engaging said receptacle and case and forming a filtering passageway between the passageway in said housing and the chamber within the case.

2. In a motor pump unit, a housing open at its ends, a pump situated at the uppermost portion of the housing, a case within the housing having a chamber therein through which air is pumped by said pump, a motor connected to the housing at one of the open ends thereof and having a motor shaft extending into said case and operating said pump, said case having an opening in one of the walls thereof facing the other open end of the housing, a receptacle attached to the other end of the said housing and having a wall spaced from and opposite the opening of said case and a filter disposed between the wall of said receptacle and the opening in said case and forming a filtering passageway between the interior of the housing and the chamber within said case.

3. In a pump unit, a housing having an opening therein, a ring disposed within said opening and spaced therefrom, fins extending from said ring to the walls of the housing and holding the ring within said opening, a head superimposing said ring, a pump diaphragm clamped between said head and ring, a rim encircling the opening in the pump housing and connected to the pump housing, fins extending between said rim and head and forming openings communicating with the openings in the housing, pump means associated with said diaphragm and means for drawing air successively through the two sets of openings to cool the parts of the pump.

4. In a pump unit, a housing having a cross head, a receptacle carried by said housing, a diaphragm extending across said cross head, a head super-imposing said cross head for clamping the diaphragm in position, said second named head having a cavity forming a pump chamber and passageways leading therefrom, said housing having other passageways communicating with the receptacle, said passageways extending through said diaphragm and communicating with said first named passageways and means for reciprocating said diaphragm.

5. In a motor pump unit, a housing, a case within said housing spaced from the walls of said housing and providing a passageway therebetween, said case having a chamber therein, a pump disposed adjacent said case and causing flow of air into said chamber, a receptacle disposed adjacent said case and carried by said housing, said receptacle having a wall spaced from one of the walls of the case, an opening in the wall of the case opposite said receptacle, a filter disposed between said wall of the receptacle and the wall of the case and covering the opening in the wall of the case, said filter forming a filter passageway between the passageway in said housing and the chamber within said case, and means forming a passageway between said pump and receptacle.

6. In a pump unit, a housing having a wall structure provided with a plurality of circumferentially arranged openings therein defining a circular portion, a head super-imposing said circular portion, a pump diaphragm clamped between said head and circular portion, a rim encircling the openings in said wall structure and connected to the pump housing, fins extending between said rim and head and forming openings therebetween communicating with the openings in said wall structure of the housing, pump means associated with said diaphragm, and means for drawing air successively through the two sets of openings to cool the parts of the pump.

7. In a pump unit, a housing having a cross head, a receptacle carried by said housing, a diaphragm extending across said cross head, a head super-imposing said cross head for clamping the diaphragm in position, said second named head having a cavity forming a pump chamber, a piston connected to said diaphragm, said piston and diaphragm having a passageway therethrough communicating with the interior of said housing, a valve for closing said passageway, a passageway leading from said pump chamber, said housing having other passageways communicating with said receptacle, said last named passageways extending through the diaphragm and communicating with said second named passageway whereby the fluid circulated is drawn through the first named passageway into said pump chamber and out through the second named passageway and into said receptacle.

RICHARD T. CORNELIUS.